(12) United States Patent
Bernard

(10) Patent No.: US 7,524,435 B2
(45) Date of Patent: *Apr. 28, 2009

(54) (CYCLO)CONDENSATION OF ISOCYANATE COMPOUNDS

(75) Inventor: Jean-Marie Bernard, Mornant (FR)

(73) Assignee: Rhodia Chimie, Aubervilliers (FR)

( * ) Notice: Subject to any disclaimer, the term of this patent is extended or adjusted under 35 U.S.C. 154(b) by 275 days.

This patent is subject to a terminal disclaimer.

(21) Appl. No.: 11/062,579

(22) Filed: Feb. 23, 2005

(65) Prior Publication Data

US 2005/0143575 A1    Jun. 30, 2005

Related U.S. Application Data

(63) Continuation of application No. 10/450,035, filed as application No. PCT/FR01/04206 on Dec. 26, 2001, now Pat. No. 6,936,677.

(30) Foreign Application Priority Data

Dec. 29, 2000    (FR) .................................. 00 17322

(51) Int. Cl.
*C07D 233/00* (2006.01)
*C07D 251/12* (2006.01)
*B01J 27/125* (2006.01)
*B01J 23/10* (2006.01)

(52) U.S. Cl. ................... 252/182.2; 548/951; 548/952; 544/193; 544/220; 544/222; 502/263; 502/162; 252/182.21; 540/202

(58) Field of Classification Search ................ 540/202; 528/52, 53, 49, 73; 502/167, 263, 162; 544/222, 544/193, 220; 548/951, 952; 252/182.2, 252/182.21

See application file for complete search history.

(56) References Cited

U.S. PATENT DOCUMENTS

| 2,978,449 | A | * | 4/1961 | France et al. ................ 544/193 |
| 3,252,942 | A | * | 5/1966 | France et al. ................ 528/49 |
| 3,252,945 | A | | 5/1966 | Ugi et al. |
| 4,006,124 | A | * | 2/1977 | Welte et al. .................. 528/52 |
| 4,697,014 | A | | 9/1987 | Robin |
| 4,801,663 | A | * | 1/1989 | Ueyanagi et al. ............ 525/528 |
| 5,149,766 | A | * | 9/1992 | Bruchmann .................. 528/49 |
| 5,264,572 | A | * | 11/1993 | Endo et al. .................. 544/193 |
| 5,436,336 | A | * | 7/1995 | Bruchmann et al. ......... 544/193 |
| 5,484,916 | A | * | 1/1996 | Bruchmann et al. ......... 540/202 |
| 6,635,761 | B1 | | 10/2003 | Revelant et al. |
| 6,653,432 | B2 | * | 11/2003 | Dallemer et al. .............. 528/55 |
| 6,936,677 | B2 | * | 8/2005 | Bernard ...................... 528/52 |
| 6,946,538 | B2 | * | 9/2005 | Bernard et al. ................ 528/73 |
| 7,091,341 | B2 | * | 8/2006 | Revelant et al. ............. 544/193 |

FOREIGN PATENT DOCUMENTS

WO    WO 99/23128    5/1999

* cited by examiner

*Primary Examiner*—Rabon Sergent
*Assistant Examiner*—Benjamin Gillespie
(74) *Attorney, Agent, or Firm*—Buchanan, Ingersoll & Rooney P.C.

(57) ABSTRACT

The use of a compound comprising a nitrogenous heterocyclic group with five cyclic members including, at least two nitrogen atoms, one of the nitrogen atoms bearing a hydrogen atom to promote the opening/closing reaction of uretidione cycles in the presence of a nucleophile compound provided that, when the nitrogenous heterocyclic group is imidazole, the opening/closing reaction is not the closing reaction of the uretidione cycle in the presence of a quaternary ammonium salt.

8 Claims, No Drawings

(CYCLO)CONDENSATION OF ISOCYANATE COMPOUNDS

CROSS REFERENCE TO RELATED APPLICATIONS

This application is a continuation of U.S. patent application Ser. No. 10/450,035, filed Jun. 10, 2003 now U.S. Pat. No. 6,936,677, which is a 371 of Application No. PCT/FR01/04206, filed on Dec. 26, 2001, which in turn claims priority of French Application No. 00/17322, filed Dec. 29, 2000, the contents of which are incorporated herein by reference.

The invention relates to a process intended for the opening of uretidione rings or the closing of isocyanate compounds to uretidione rings.

A subject matter of the invention is more particularly the (cyclo)condensation of isocyanate compounds.

In the chemistry of polyisocyanates, in particular in processes for the synthesis of polyisocyanate trimers having an isocyanurate ring, it is generally desirable, in particular for reasons of viscosity, to obtain a reaction product having a certain content of compounds comprising a uretidione ring.

Generally, compounds comprising a uretidione ring, also known as dimers, are obtained by dimerization of isocyanate compounds in the presence of a dimerization catalyst, such as a trialkyphosphine, a tris(N,N-dialkyl)phosphotriamide or an N,N,N',N'-tetraalkylguanidine.

In addition, WO 99/23128 discloses a process for the catalytic trimerization of isocyanate using a catalyst based on a quaternary ammonium salt in which imidazole or one of its derivatives is used as cocatalyst, so as to increase the reactivity of isocyanates, in particular of cycloaliphatic isocyanates, and to efficiently control the reactivity, without depending on the content of hydrolyzable chlorine present in the starting isocyanate monomer.

Furthermore, the document discloses that the use of imidazole as cocatalyst of a trimerization reaction in which the catalyst is a quaternary ammonium salt results in the formation of dimeric compounds comprising a uretidione ring.

The amount of imidazole or its derivatives is such that the imidazole/quaternary ammonium molar ratio is of about 14 or more.

Furthermore, it is known that imidazole and other nitrogenous cyclic compounds having a 5-membered nitrogenous heterocyclic group comprising at least two nitrogen atoms add to the isocyanate functional group at ambient temperature in accordance with the reaction scheme:

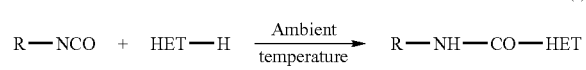
(I)

R being the residue of an isocyanate compound after removal of an isocyanate functional group and HET-H being a nitrogenous heterocyclic compound as defined above, bonded to the NCO group via the NH group of the heterocycle.

At high temperatures, of about 80 to 100° C., the nitrogenous heterocycles as described above are released from the NCO functional group according to the reaction scheme:

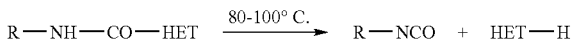

The release temperature of the nitrogenous heterocyclic compounds is relatively low in comparison with other agents which block the NCO functional group. For this reason, imidazole and the nitrogenous heterocycles as defined above are regarded as "good leaving groups".

Furthermore, it is known that, when the HET-H/NCO ratio is small, the equilibrium of the reaction is shifted toward the formation of the protected form of the isocyanate (I).

The studies carried out by the inventors have allowed it to be found that, in the presence of an anionic compound, in particular resulting from a strong base, such as a cyclocondensation catalyst of anionic nature, the reaction of an isocyanate with a heterocycle as defined above surprisingly promotes the formation of a monouretidione compound, also denoted by "true dimer", resulting from the polycondensation of two starting isocyanate molecules and comprising a single uretidione ring.

The mechanism proposed by the inventors is based on the hypothesis that, in the presence of isocyanate and of an anionic compound, as defined above, the 5-membered heterocyclic compound promotes the addition of the isocyanate functional group to the urea-HET (I) to give a biuret-HET compound, also denoted by "pseudobiuret", of formula (II):

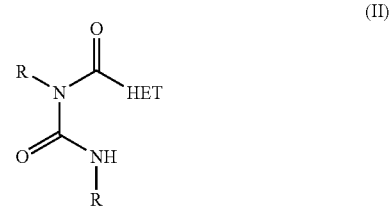
(II)

Because of the nucleofuge characteristics of the HET group, this pseudobiuret rapidly cyclodimerizes to "true dimer" with release of HET-H, which rapidly reacts with the excess isocyanate functional groups in accordance with the reaction scheme:

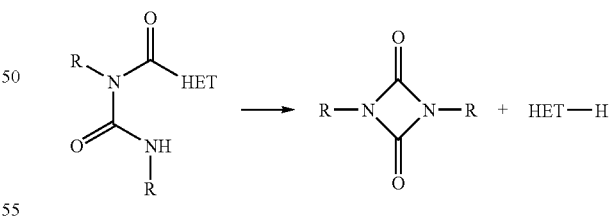

Everything happens as though the base composed of the anionic group of the cyclocondensation catalyst accelerated the cyclodimerization kinetics by promoting the abstraction of a proton from the pseuodbiuret, followed by a cyclization reaction of the nucleophilic nitrogen atom thus created onto the carbonyl group of the urea functional group with release of the vicinal HET heterocyclic group.

Regarding the heterocyclic groups comprising an NH group, the addition of the nitrogenous heterocyclic group to the isocyanate functional group takes place via this group, with subsequent release of a HET-H compound.

Regarding the substituted heterocyclic groups, the addition of the nitrogenous heterocycle probably takes place via an =N-functional group of the nitrogenous heterocyclic compound.

In other words, in a reaction medium comprising isocyanate and uretidione functional groups, the kinetics of addition of a HET-H group to the isocyanate functional group are faster than the kinetics of addition of HET-H to the "true dimer" compound.

Furthermore, the studies of the inventors have made it possible to find that, when the level of NCO functional groups present in the reaction medium decreased and at a temperature of at least 40° C., the HET-H compound acted by opening the uretidione ring and promoted, in the presence of an isocyanate monomer, the formation of a higher homologous cyclocondensation compound, in other words the cyclotrimerization reaction.

It was moreover known that some nucleophilic compounds Nu-H could promote the opening of the uretidione rings to form the corresponding addition products, according to the reaction scheme:

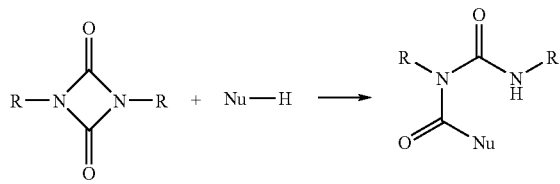

Thus, it is described in Houben-Weyl, "Methoden der Organischen Chemie", 4th Edition, Georg Thieme Verlag, (1983), pp 1110, that aliphatic amines open the uretidione ring at ambient temperature. On the other hand, alcohols open uretidione rings only at high temperature, generally from 140-150° C.

Surprisingly, the present invention has made it possible to determine that the heterocyclic compounds defined above catalyzed the addition reaction of nucleophilic compounds with the uretidione ring.

Thus, the in the case in particular of alcohols, the addition reaction of the alcohol with the uretidione ring takes place at low temperature, generally from approximately 80 to 100° C., instead of the high temperatures described above.

This property can be taken advantage of in a particularly advantageous way in the opening of uretidione rings originating from the condensation of isocyanate monomers, that is to say of monomers in which the NCO functional group is carried by a carbon atom which is sterically hindered, for example, IPDI dimers, the opening of which is more difficult than for the true dimers formed by cyclodimerization of weakly hindered isocyanate monomers, such as HDI.

A subject matter of the invention is the use of a compound comprising at least one nitrogenous heterocyclic group having at least five atoms in the ring, at least two of them being nitrogen atoms, for promoting the reaction of closing uretidione rings or of opening uretidione rings and their reaction with an isocyanate compound or a nucleophilic compound comprising a mobile hydrogen atom, with the proviso that, when the nitrogenous heterocyclic group is imidazole, the opening/closing reaction is not the reaction of closing isocyanate compounds to uretidione rings in the presence of a quaternary ammonium salt.

The nitrogenous cyclic compound advantageously has 5 members and is advantageously selected preferably from imidazole, triazole, tetrazole and their derivatives comprising one or more substituents, in particular from 1 to 4 substituents, according to the nature of the ring.

The substituents can, independently of one another, be selected from the —R, —OR, —SR, —NRR", —COR, —CONRR', —NRCOR' and —NRCOOR' groups, R and R', which are identical or different, being selected from a hydrogen atom, a $C_1$-$C_4$ alkyl, $C_3$-$C_8$ cycloalkyl or $C_5$-$C_{10}$ aryl group and a heterocycle comprising from 2 to 10 carbon atoms and from 1 to 4 identical or different heteroatoms selected from O, S and N and the —NR" group,R" being a $C_1$-$C_4$ alkyl or $C_3$-$C_8$ cycloalkyl group, the alkyl, cycloalkyl, aryl or heteroaryl groups optionally being substituted by one or more groups selected from OH, COOH, $NH_2$, SH, alkoxy or alkoxycarbonyl.

The nitrogenous heterocyclic compound can also be an isocyanate masked by a masking agent corresponding to the definition of the nitrogenous heterocyclic compounds given above, in other words a precursor of a nitrogenous heterocyclic compound as defined above.

Preference is given to the compounds having an imidazole nucleus unsubstituted on the nitrogen atom or having an imidazole nucleus carrying an N-alkyl or N-aryl substituent having from 1 to 20 carbon atoms, preferably N-methyl.

According to a first embodiment of the invention, the nitrogenous heterocyclic compound is used to promote the reaction of closing a uretidione ring, from starting isocyanate monomers, the latter being in excess with respect to the nitrogenous heterocyclic compounds.

According to a second embodiment of the invention, the nitrogenous heterocyclic compound is used to promote the reaction of opening a uretidione ring in the presence of an anionic compound resulting in particular from a strong base, said base being in particular a catalyst for the cyclocondensation of isocyanates.

A large number of cyclocondensation catalysts, in particular cyclotrimerization catalysts, are anionic compounds within the meaning of the present invention.

The anionic compound can comprise in particular an alkoxide, hydroxide, fluoride, acetate, carbonate, hydrogencarbonate, carboxylate or a silazane salt of inorganic or organic cations.

Mention may be made, among inorganic cations, of alkali metals, alkaline earth metals, transition metals and rare earth metals.

Preference is given, among organic salts, to "oniums" or "iniums". The oniums are selected from the group of the cations formed by the elements from Groups Vb and VIb (as defined in the Periodic Table of the Elements published in the Supplement to the "Bulletin de la Société Chimique de France" in January 1966) with 4 (case of Group Vb) or 3 (case of Group VIb) hydrocarbon chains.

Advantageously, the organic salt of the invention is, in this case, a phosphonium, sulfonium, ammonium, oxonium or diazonium.

The "iniums", to which body the pyridiniums belong, derive from the oniums by the replacement of two substitutents by a doubly bonded substituent.

A first type of trimerization catalyst particularly suited to the invention when it is used in combination with a nitrogenous cyclic compound as described above is composed of rare earth metal alkoxides. Reference will be made, for the definition of the rare earth metal elements, to the table on page B-208 of "Handbook of Chemistry and Physics", Editor Robert C. Weast, 67th edition).

These comprise the following elements: scandium yttrium, lanthanum and the lanthanides (cerium, praseodymium, neodymium, samarium, europium, gadolinium, terbium, ytterbium and lutetium).

According to the invention, it is possible to add a compound comprising a rare earth metal alkoxide functional group or a mixture of compounds. The rare earth metal alkoxide functional group can consist of any functional group obtained by substitution of an alcoholic OH group by a rare earth metal.

Mention may in particular be made of propoxides, especially isopropoxides, in particular the isopropoxide of the following rare earth metal elements: Y, Sm, Yb and La.

The following are also satisfactorily suitable: methoxides, ethoxides and butoxides, and also alkoxides of poly(alkylene glycol), preferably at least one of the alcohol functional groups of which at the chain end is substituted by an ether or ester functional group or the like.

A second type of trimerization catalyst is composed of the alkali metal, alkaline earth metal, tin or zinc salts, or salts of other metals of carboxylic acids, such as acetic acid, propionic acid, octanoic acid or benzoic acid.

A third type of catalyst is composed of the alkali metal, alkaline earth metal, tin or zinc salts of alkoxides or phenoxides.

A fourth type of catalyst is formed by quaternary ammonium hydroxides, carbonates, hydrogencarbonates or carboxylates.

A fifth type of catalyst is composed of the silazane salts or the silanolates of inorganic or organic cations. These are in particular the compounds of formula (1) or (2):

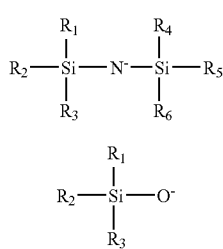

in which the symbols:

$R_1$, $R_2$, $R_3$, $R_4$, $R_5$ and $R_6$, which are identical or different, represent an aliphatic, cycloaliphatic, which is saturated or unsatured, aryl, aralkyl or alkylaryl monovalent group of hydrocarbon nature, optionally substituted by halogen atoms or CN or ester groups, or in the formula (1), one of $R_1$, $R_2$, $R_3$, $R_4$, $R_5$ and $R_6$ represents a unit of formula:

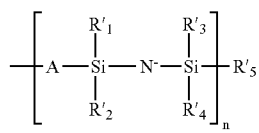

A being an alkylene group having from 1 to 30 carbon atoms, advantageously from 2 to 20 carbon atoms, preferably $(CH_2)_{n'}$ with n' between 1 and 6, advantageously from 2 to 6, and $R'_1$ to $R'_5$, which are identical or different, representing an aliphatic, cycloalphatic, which is saturated or unsaturated, aryl, aralkyl or alkylaryl monovalent group of hydrocarbon nature, optionally substituted by halogen atoms or CN or ester groups, and n is an integer between 1 and 50, or two from $R_1$, $R_2$ and $R_3$, on the one hand, and/or $R_4$, $R_5$ and $R_6$, on the other hand, together form a divalent hydrocarbon group, and/or at least one group selected from $R_1$, $R_2$ and $R_3$ forms, with at least one group chosen from $R_4$, $R_5$ and $R_6$, a divalent hydrocarbonaceous group.

Advantageously, $R_1$ to $R_6$ and $R'_1$ to $R'_5$, which are identical or different, represent:

an alkyl, alkenyl, haloalkyl or haloalkenyl group having from 1 to 20, preferably from 1 to 6, carbon atoms and optionally comprising chlorine and/or fluorine atoms, a cycloalkyl, cycloalkenyl, halocycloalkyl or halocycloalkenyl group having from 3 to 30, preferably 3 to 10, carbon atoms and comprising chlorine and/or fluorine atoms, an aryl, alkylaryl or haloaryl group having from 6 to 30, preferably 6 to 10, carbon atoms and comprising chlorine and/or fluorine atoms, a cyanoalkyl group having from 1 to 6 carbon atoms, or two groups from $R_1$, $R_2$ and $R_3$ or $R_3$, $R_4$ and $R_5$ together form a divalent radical comprising from 2 to 5 carbon atoms, or two from $R_1$, $R_2$ and $R_3$, on the one hand, and/or $R_4$, $R_5$ and $R_6$, on the other hand, together form a divalent hydrocarbon group, or at least one group selected from $R_1$, $R_2$ and $R_3$ forms, with at least one group selected from $R_4$, $R_5$ and $R_6$, a divalent hydrocarbon group comprising from 2 to 5 carbon atoms.

Particularly preferred groups $R_1$ to $R_6$ and $R'_1$ to $R'_5$ are selected from methyl, ethyl, propyl, if appropriate linear or branched, vinyl and phenyl, which can optionally be chlorinated and/or fluorinated.

When the groups $R_1$ to $R_6$ and $R'_1$ to $R'_5$ are chlorinated and/or fluorinated, the number of halogen atoms varies from 1 to all the available valencies.

Mention may most particularly be made of the salts of the following silazane compounds:

hexamethyldisilazane 1,3-diethyl-1,1,3,3-tetramethyldisilazane 1,3-divinyl-1,1,3,3-tetramethyldisilazane hexaethyldisilazane, and 1,3-diphenyl-1,1,3,3-tetramethyldisilazane.

Mention may also be made of the following silanolates:

trimethylsilanolate, triethylsilanolate, ethyldimethylsilanolate, vinyldimethylsilanolate.

The salt of the compound of formulae (1) and (2) can be a monovalent or multivalent inorganic salt or a mixture of these salts. The preferred inorganic salts are those of K, Li, Na and Mg.

The salt of the compound of formulae (1) and (2) can also be a monovalent or multivalent organic salt or a mixture of these salts. The preferred organic salts are the stable "oniums" or "iniums".

In the case of multivalent cations, the salt according to the invention can comprise at least one ligand of formula (1) or (2) above and optionally one or more different ligands. It is generally preferable for all the ligands to be compounds of formula (1) or (2).

The number of ligands depends on the valency of the inorganic or organic cation and on the number of nitrogen atoms in the compound of formula (1).

When the nucleophilic compound or the solvent is an alcohol, the use of a catalyst of silazane salt type is avoided.

It is also possible to use, as catalyst, an anionic compound having a nitrogenous group of the type described above. Mention may in particular be made of histidine in its metal carboxylate form, which will act both via its imidazole heterocycle, to bond to the NCO functonal group, and the COO⁻ functional group of the amino acid group, to catalyze the cyclotrimerization of the isocyanate monomers.

A nitrogenous cyclic compound as defined above makes it possible, when it is added to a polycondensation catalyst, in particular a catalyst for the (cyclo)trimerization of isocyanates, of anionic type in a nitrogenous cyclic compound/anionic catalyst molar ratio of between 0.1 and 10, in particular between 0.2 and 5, preferably 0.3 and 2.5, to obtain a reaction product comprising true polyisocyanate dimers and true polyisocyanate trimers in a true polyisocyanate dimers/true polyisocyanate trimers ratio of greater than 0.5, in particular of greater than 0.6, preferably of greater than 0.75, indeed even of greater than 1.

Another subject matter of the invention is a process of the preparation of a polyisocyanate composition comprising polyisocyanate trimers, in particular true polyisocyanate trimers, and polyisocyanate dimers, in particular true polyisocyanate dimers, in which the true polyisocyanate dimers/true polyisocynate trimers molar ratio is greater than 0.5, in particular greater than 0.6, preferably greater than 0.75, indeed even greater than 1, in which isocyanate monomers are polycondensed in the presence of a cyclotrimerization catalyst of anionic type and of a nitrogenous compound composed of a five-membered heterocyclic compound having at least two nitrogen atoms, the nitrogenous cyclic compound/anionic catalyst molar ratio being between 0.1 and 10, advantageously between 0.2 and 5, preferably between 0.3 and 2.5.

In the present invention, the term "true dimers" denotes the compounds obtained by condensation of two molecules of starting isocyanate monomers comprising a single uretidione ring.

The term "true trimers" denotes the compounds obtained by condensation of three molecules of starting isocyanate monomers comprising a single uretidione ring.

The term "heavy compounds" denotes the compounds obtained by condensation of more than three molecules of isocyanate monomers, in particular "bis-trimers", "bis-dimers", "tris-trimers" and "dimers-trimers".

Bis-trimers are polyisocyanate molecules comprising two isocyanurate rings, in which the link between the two isocyanurate rings is provided by a monomer unit, namely that two monomer units are involved in each of the isocyanurate rings.

Bis-dimers are polyisocyanate molecules comprising two uretidione rings, in which the link between the two uretidione rings is provided by a monomer unit, namely that two monomers units are involved in each of the uretidione rings.

Tris-trimers are higher homologs of the bis-trimers comprising three isocyanurate rings.

In the case where the monomers are diisocyanates, tris-trimers are obtained by polycondensation of seven monomer chains and comprise three isocyanurate rings, two consecutive isocyanurate rings being connected in pairs by a monomer unit.

Dimers-trimers are higher homologs of the above compounds comprising an isocyanurate functional group and a monouretidione functional group.

The process according to the invention can be used for the cyclocondensation of all types of isocyanates or mixtures of isocyanates as defined above, whether aliphatic, cycloaliphatic or aromatic, including prepolymers having end isocyanate groups, in particular those disclosed in U.S. Pat. No. 5,115,071, the content of which is incorporated by reference in the present application. It can also be used for the trimerization of isocyanates in the presence of various diols, triols and other polyols with molecular weights lying within a wide range, including polyols and aminopolyols, comprising polyether and polyester groups, employed in the production of polyurethane and polyisocyanurate resins. However, diisocyanates are preferred.

The diisocyanates for which the invention is advantageous are those where the nitrogen atom is bonded to a carbon of sp³ hybridization and more particularly (cyclo)aliphatic diisocyanates. Mention may in particular be made of polymethylene diisocyanates, namely the compounds having at least two isocyanate functional groups comprising a $(CH_2)_\pi$ sequence where $\pi$ represents an integer from 2 to 10, advantageously from 4 to 8. When there are several sequences, the latter can be the same or different. In addition, it is desirable for at least one, preferably all, these sequences to be free to rotate and therefore exocyclic.

The preferred examples of polymethylene diisocyanates are TMDI (tetramethylene diisocyanate), HDI [hexamethylene diisocyanate, $OCN—(CH_2)_6-NCO$] and MPDI (2-methylpentane diisocyanate) and the 3,3,5- or 3,5,5-trimethylhexamethylene diisocyanates.

In the case of a mixture obtained from several (generally two) types of monomers, it is preferable for that or those of the monomers which corresponds to the above conditions, and in particular to the condition with regard to the presence of polymethylene $(CH_2)_\pi$ sequences, to represent at least one third, advantageously a half, preferably two thirds, of the masked isocyanate functional groups.

Isocyanate monomers which are particularly well suited are cycloaliphatic monomers, that is to say those where the backbone comprises an aliphatic ring.

These monomers are advantageously such that at least one, advantageously both, isocyanate functional groups is distant from the closest ring by at the most one carbon, and is preferably connected directly to it. In addition, these cycloaliphatic monomers advantageously exhibit at least one, preferably two, isocyanate functional groups selected from secondary, tertiary or neopentyl isocyanate functional groups.

The best results are obtained when the conformational freedom of the cycloaliphatic monomer is low. Mention may be made, as monomers capable of giving good results, by way of example, of the following monomers:

the compounds corresponding to the hydrogenation of the aromatic nucleus or nuclei carrying isocyanate functional groups of aromatic isocyanate monomers and in particular of TDI (toluene diisocyanate) and diisocyanatobiphenyls.

The following compounds are particularly preferred:
the various BIC [bis(isocyanatomethylcyclohexane)] compounds; and in particular norbornane diisocyanate, often known by its abbreviation NBDI;

isophorone diisocyanate or IPDI or 3-isocyanatomethyl-3,5,5-trimethylcyclohexyl isocyanate;

$H_{12}$MDI [1,1-methylenebis(4,4-isocyanatocyclohexane)].

Arylenedialkylene diisocyanates, such as $OCN—CH_2-Ø-CH_2—NCO$, are also suitable for the process of the invention.

When the catalyst is a rare earth metal alkoxide, the nitrogenous cyclic compound/rare earth metal alkoxide molar ratio advantageously varies between 0.1 and 10, preferably between 0.2 and 5.

The reaction temperature is the temperature commonly employed for the catalytic trimerization and depends on the type of catalyst.

When the catalyst is a rare earth metal alkoxide, the reaction temperature is generally between 20° C., advantageously 50° C., and 200° C., advantageously 150° C.

When the catalyst is a silazane salt, the reaction temperature is generally between 20° C., advantageously 40° C., and 200° C., advantageously 150° C.

It is generally preferable to add the catalyst and the nitrogenous cyclic compound simultaneously in a solvent solution to the reaction medium.

Mention may be made, as solvents, of substituted aromatic hydrocarbons, such as Solvesso®, toluene or xylene, or esters (n-butyl acetate) or ethers (propylene glycol methyl ether).

When the catalyst is a rare earth metal alkoxide, it is generally preferable to add the latter at the same time as the nitrogenous cyclic compound, in particular imidazole or N-methylimidazole, in solution in an alcohol ether, for example methoxyethanol.

The reaction is stopped at the desired degree of conversion of the NCO functional groups. This is generally between 5 and 100%, advantageously between 10 and 80%.

Another subject matter of the invention is the use of a nitrogenous heterocyclic compound as defined above in promoting the opening of a uretidione ring and its reaction with a nucleophilic compound.

The nucloephilic compound is advantageously a compound having at least one functional group having a mobile hydrogen atom, the functional group reacting with the isocyanate functional group, such as alcohols, phenols, amines, thiols, acids, amides, carbamates or ureas, or compounds which release a functional group comprising mobile hydrogen during the reaction, in other words the precursors of the compounds listed above.

The nucleophilic compound is advantageously selected from mines, alcohols and thiols, preferably primary or secondary alcohols. Use may also be made of polyols, polyesters, polyethers, polyacrylics, polyurethanes, and the like.

The invention is also particularly advantageous for compositions for polyurethane powder paints. The polyol compounds are in this case powder compounds. For compositions for polyurethane powder paints, use is made in particular of IPDI or HDI dimers or their derivatives, or compositions for powder paints comprising uretidione functional groups resulting from the condensation of aliphatic or cycloaliphatic isocyanates.

The advantage of using a heterocyclic compound within the meaning of the invention makes it possible to lower the thermal threshold of the crosslinking, which is generally between 80 and 150° C. in the presence of the heterocyclic compound, whereas, in the absence of heterocyclic compound, the crosslinking temperatures are greater than 180° C., generally between 200 and 220° C. The compositions for powder paints are generally stable on storage at a temperature of greater than 0° C., preferably of greater than 20° C. The choice will therefore be made of polyols with a glass transition temperature (Tg) appropriate for the crosslinking temperature. The Tg depends on the base units of the polymer and thus on the final structure of the polymer. It is generally between −20° C. and 150° C., preferably between 0 and 100° C. and advantagouesly between 20 and 80° C.

In the case of polyurethane powder compositions, the heterocyclic compound can be incorporated at various stages in the manufacture of the powder paint, either at the stage of the synthesis of the dimer compound, or in the polyol, or during the manufacture of the powder paint in combination with the various constituents of the paint, for example during extrusion.

The operating conditions for the preparation of this powder will thus be optimized so that there is not an excessively great reaction between the dimer and the compounds comprising mobile hydrogen.

To do this, the extrusion conditions, namely the conditions for extrusion of the polyurethane powder paint, will in particular be optimized, the extrusion temperature generally being approximately 100° C. with an extrusion time of less than 30 minutes.

The nucleophilic functional group/uretidione ratio is between 10 and 0.05, preferably between 5 and 0.1, advantageously between 3 and 0.25, it being possible for this ratio to be obtained at any stage of the crosslinking reaction. In the case where the ratio is small, dimer functional groups are retained and can react subsequently with other subsequent nucleophilic functional groups. In the case where the ratio is higher, the nucleophilic functional groups are retained and can react with other functional groups, such as free isocyanate, masked isocyanate, anhydride or oxirane functional groups, and the like.

In the case of powder paints, it is preferable for the heterocyclic compounds to be solids, that is to say for them to have a melting point of greater than 25° C., preferably of greater than 50° C. Preference will therefore be given to heterocyclic compounds, preferably substituted heterocyclic compounds, having an aliphatic chain with a number of carbon atoms of between 1 and 10.

Use may also be made of heterocyclic compounds according to the invention in solution with polyols and uretidione polyisocyanate compounds. In this case, the same solvent will be selected as that used for the final formulations, preferably an ester, ether, substituted aromatic hydrocarbon or possibly water for the compositions of water paint type.

It is not necessary for the nucleophilic compound participating in the opening of the uretidione ring by the nitrogenous heterocyclic compound to be an ionic compound. However, the presence of such a compound is not harmful to the reaction of opening the ring and thus the application of the final coating.

The following examples illustrate the invention. Unless otherwise indicated, percentages are expressed by weight. The trimerization catalyst/imidazole ratios are molar ratios.

EXAMPLE 1

Polycondensation of IPDI in the Presence of lanthanum tris(2-methoxy-ethylene glycolate) and of imidazole Preparation of the Catalyst Solution:

The catalyst solution is prepared in a first step:

1.87 g (0.0275 mol) of imidazole are introduced into 100 mL of a 10 weight % solution of lanthanum tris(2-methoxy-ethylene glycolate) in 2-methoxyethanol (density 1.01). The imidazole/lanthanum tris(2-methoxy-ethylene glycolate) molar-ratio is equal to 1.

Reaction 20 g of isophorone diisocyanate (IPDI), i.e. 0.09 mol, i.e. 0.18 mol of NCO, are added at ambient temperature under a stream of nitrogen to a 50 mL 3-necked reactor. The catalytic solution (1 g, i.e. 2.75×10$^{-4}$ mol of imidazole and 2.75×10$^{-4}$ mol of lanthanum tris(2-methoxy-ethylene glycolate)) is added to the reaction medium. The amounts of lanthanum alkoxide and of imidazole are respectively equal to 100 mg and 19 mg, i.e. a metal/NCO ratio of 1.5×10$^{-3}$. The temperature of the reaction medium is brought to 60° C. and the reaction is left stirring for 5 hours and is then blocked by addition of para-toluenesulfonic acid (200 mg). The degree of conversion of the IPDI is 54.7%.

The analysis of the reaction medium before removal of the IPDI monomer is presented in the table below:

| Product | Percentages by weight |
|---|---|
| IPDI | 55.3 |
| Carbamate of IPDI and of 2-methoxyethanol | |
| Allophanate of IPDI and of 2-methoxyethanol | 8.8 |
| IPDI dimmer | 13.8 |
| True IPDI trimer | 13.2 |
| IPDI bis-trimer | 6.8 |
| Heavy compounds, including tris-trimers | 2.1 |
| True trimer/sum of the trimers ratio | 0.625 |
| True trimer/sum of the true dimers and trimers ratio | 1 |
| True dimer/true trimer ratio | 1.04 |

The presence is recorded of allophanate and dimer functional groups under the unresolved peaks of the bis-trimers and heavy compounds.

EXAMPLE 2

Polycondensation of IPDI in the presence of yttrium tris(2-methoxy-ethylene glycolate) and of imidazole The operation is carried out as for example 1, the lanthanum alkoxide being replaced by that of yttrium.

20 g of isophorone diisocyanate (IPDI), i.e. 0.09 mol, i.e. 0.18 mol of NCO, are added at ambient temperature under a stream of nitrogen to a 50 mL 3-necked reactor. The catalytic solution is added to the reaction medium. The amounts of yttrium alkoxide and of imidazole are respectively equal to 150 mg and 32 mg, i.e. a metal/NCO ratio of 2.6×10$^{-3}$. The temperature of the reaction medium is brought to 60° C. and the reaction is left stirring for 5 hours and is then blocked by addition of para-toluenesulfonic acid (200 mg). The degree of conversion of the IPDI is 41%.

The analysis of the reaction medium before removal of the IPDI monomer is presented in the table below:

| Product | Percentages by weight |
|---|---|
| IPDI | 59 |
| Carbamate of IPDI and of 2-methoxyethanol | 1.6 |
| Allophanate of IPDI and of 2-methoxyethanol | 9.6 |
| IPDI dimmer | 15.2 |
| True IPDI trimer | 8.4 |
| IPDI bis-trimer | 3.8 |
| Heavy compounds, including tris-trimers | 0.8 |
| True trimer/sum of the trimers ratio | 0.65 |
| True trimer/sum of the true dimers and trimers ratio | 0.3 |
| True dimer/true trimer ratio | 1.81 |

The presence is recorded of allophanate and dimer functional groups under the unresolved peaks of the bis-trimers and heavy compounds.

EXAMPLE 3

Polycondensation of IPDI in the presence of yttrium tris(isopropoxide) and of imidazole 20 g of isophorone diisocyanate (IPDI), i.e. 0.09 mol, i.e. 0.18 mol of NCO, are added at ambient temperature under a stream of nitrogen to a 50 mL 3-necked reactor. 200 mg of yttrium tris(isopropoxide) (7.5×10$^{-4}$ mol) and 51 mg of imidazole are added, i.e. a metal/NCO ratio of 4×10$^{-3}$. The temperature of the reaction medium is brought to 60° C. and the reaction is left stirring for 5 hours and is then blocked by addition of para-toluenesulfonic acid (150 mg). The NCO assay is 0.552 and the degree of conversion of the IPDI is 77.3%.

The analysis of the reaction medium before removal of the IPDI monomer is presented in the table below:

| Product | Percentages by weight |
|---|---|
| IPDI | 23.6 |
| Carbamate of IPDI and of isopropyl | |
| Allophanate of IPDI and of isopropyl | 3.5 |
| IPDI dimmer | 20.9 |
| True IPDI trimer | 22 |
| Bis-trimer and trimer-dimer of IPDI and trimer-allophanate | 10.3 |
| Heavy compounds, including tris-trimers | 0.8 |
| True trimer to sum of the trimers ratio | 0.66 |
| True trimer to sum of the true dimer and true trimer ratio | 0.41 |
| True dimer/true trimer ratio | 0.95 |

The presence is recorded of allophanate and dimer functional groups under the unresolved peaks of the bis-trimers and heavy compounds.

EXAMPLE 4

Polycondensation of IPDI in the presence of neodymium tris(isopropoxide)

The operation is carried out as for example 3, the yttrium alkoxide being replaced by that of neodymium.

20 g of isophorone diisocyanate (IPDI), i.e. 0.09 mol, i.e. 0.18 mol of NCO, are added at ambient temperature under a stream of nitrogen to a 50 mL 3-necked reactor. 1% by weight of neodymium tris(isopropoxide) with respect to the IPDI, i.e. 200 mg (i.e. 6.2×10$^{-4}$ mol, i.e. a metal/NCO ratio of 3.5×10$^{-3}$) and 42 mg of imidazole are added to the reaction medium. The temperature of the reaction medium is brought to 60° C. and the reaction is left stirring for 5 hours. The reaction is halted by addition of 200 mg of para-toluenesulfonic acid.

The analysis of the reaction medium before distillation of the IPDI monomer by chromatography gives the following composition:

| Product | Percentages by weight |
|---|---|
| IPDI | 39.4 |
| Carbamate of IPDI and of isopropyl | 0 |
| Allophanate of IPDI and of isopropyl | 1.2 |
| IPDI dimmer | 31.4 |
| IPDI bis-dimer | 4.6 |
| True IPDI trimer | 13 |
| IPDI bis-trimer | 4.8 |
| Heavy compounds, including tris-trimers | 4.2 |
| True trimer to sum of the trimers ratio | 0.59 |

-continued

| Product | Percentages by weight |
|---|---|
| True trimer to sum of the true dimer and true trimer ratio | 0.3 |
| True dimer/true trimer ratio | 2.4 |

The presence is recorded of allophanate functional groups under the unresolved peaks of the bis-trimers and heavy compounds.

EXAMPLE 5

Polycondensation of IPDI in the presence of yttrium tris(isopropoxide) and of imidazole 20 g of isophorone diisocyanate (IPDI), i.e. 0.09 mol, i.e. 0.18 mol of NCO, are added at ambient temperature under a stream of nitrogen to a 50 mL 3-necked reactor. 200 mg of yttrium tris(isopropoxide) ($7.5 \times 10^{-4}$ mol) and 51 mg of imidazole are added, i.e. a metal/NCO ratio of $4 \times 10^{-3}$. The temperature of the reaction medium is brought to 60° C. and the reaction is left stirring for 5 hours and is then blocked by addition of para-toluenesulfonic acid (150 mg). The NCO assay is 0.552 and the degree of conversion of the IPDI is 77.3%.

The analysis of the reaction medium before removal of the IPDI monomer is presented in the table below:

| Product | Percentages by weight |
|---|---|
| IPDI | 23.6 |
| Carbamate of IPDI and of isopropyl | |
| Allophanate of IPDI and of isopropyl | 3.5 |
| IPDI dimer | 20.9 |
| True IPDI trimer | 22 |
| Bis-trimer and trimer-dimer of IPDI and trimer-allophanate | 10.3 |
| Heavy compounds, including tris-trimer | 0.8 |
| True trimer to sum of the trimers ratio | 0.66 |
| True trimer to sum of the true dimer and true trimer ratio | 0.41 |
| True dimer/true trimer ratio | 0.95 |

The presence is recorded of allophanate and dimer functional groups under the unresolved peaks of the bis-trimers and heavy compounds.

EXAMPLE 6

Polycondensation of IPDI in the presence of yttrium tris(isopropoxide) and of N-methylimidazole 20 g of isophorone diisocyanate (IPDI), i.e. 0.09 mol, i.e. 0.18 mol of NCO, are added at ambient temperature under a stream of nitrogen to a 50 mL 3-necked reactor. 200 mg of yttrium tri(isopropoxide) ($7.5 \times 10^{-4}$ mol) and 51 mg of N-methylimidazole are added, i.e. a metal/NCO ratio of $4 \times 10^{-3}$. The temperature of the reaction medium is brought to 60° C. and the reaction is left stirring for 5 hours and is then blocked by addition of para-toluenesulfonic acid (150 mg). The presence of dimer and trimer bands is observed.

The analysis of the reaction medium before removal of the IPDI monomer is presented in the table below:

| Product | Percentages by weight |
|---|---|
| IPDI | 50 |
| Carbamate of IPDI and of isopropyl | |
| Allophanate of IPDI and of isopropyl | 3 |
| IPDI dimmer | 5 |
| True IPDI trimer | 23 |
| Bis-trimer and trimer-dimer of IPDI and trimer-allophanate | 12 |
| Heavy compounds, including tris-trimers | 7 |
| True trimer to sum of the trimers ratio | 0.55 |
| True trimer to sum of the true dimer and true trimer ratio | 0.49 |
| True dimer/true trimer ratio | 0.2 |

The presence is recorded of allophanate and dimer functional groups under the unresolved peaks of the bis-trimers and heavy compounds.

COMPARATIVE EXAMPLE 1

The operation is carried out as for example 1, except that a methoxybutanol solution comprising 5% by weight of lanthanum tris(2-methoxy-ethylene glycolate) is added.

COMPARATIVE EXAMPLE 2

The operation is carried out as for example 2, except that a methoxyethylethoxide solution comprising 5% of yttrium tris(2-methoxy-ethylene glycolate) is added.

COMPARATIVE EXAMPLE 3

The operation is carried out as for example 3, except that a solution comprising 200 mg of yttrium tris(isopropoxide) is added.

COMPARATIVE EXAMPLE 4 (CMI 129902)

The operation is carried out as for example 4, except that a solution comprising 200 mg of neodymium tris(isopropoxide) is added. The results are reported in the table below:

TABLE

| Product/Component | Ex. 1 | Ex. 2 | Comp. Ex. 1 | Comp. Ex. 2 | Ex. 3 | Comp. Ex. 3 | Ex. 4 | Comp. Ex. 4 |
|---|---|---|---|---|---|---|---|---|
| Catalyst | 5% 50/50 alkoxide/ imidazole | 5% 50/50 Y methoxyethoxide alkoxide/ imidazole | 5% La alkoxide | 5% Y alkoxide | 50/50 Y(iPrO)$_3$/ imidazole | Y(iPrO)$_3$ | 50/50 Nd(iPrO)$_3$/ imidazole | Nd(iPrO)$_3$ |
| IPDI | 55.3 | 59.0 | 25.5 | 61.5 | 23.6 | 7.9 | 39.4 | 16.5 |
| True dimer | 13.8 | 15.2 | | | 20.9 | | 31.4 | |
| Bis-dimer | — | | | | | | 4.6 | |
| IPDI carbamates | — | 1.6 | 0.5 | | | 1.6 | | |

TABLE-continued

| Product/Component | Ex. 1 | Ex. 2 | Comp. Ex. 1 | Comp. Ex. 2 | Ex. 3 | Comp. Ex. 3 | Ex. 4 | Comp. Ex. 4 |
|---|---|---|---|---|---|---|---|---|
| True trimer | 13.2 | 8.4 | 27.0 | 11.6 | 22 | 32.1 | 13 | 40.2 |
| Bis-trimers + (trimer-dimers) | 6.8 | 3.8 | 20.4 | 12.0 | 9.1 | 17.3 | 4.8 | 21.3 |
| Heavy compounds | 2.1 | 0.8 | 19.9 | 5.4 | 7.5 | 35.3 | 3.2 | 6.4 |
| Trimer-allophanate | | | | | 1.2 | 2.6 | 1.2 | 0.8 |
| Allophanate of IPDI and originating from the alkoxide | 8.8 | 9.6 | 6.7 | 9.5 | 3.5 | 3.2 | 1.2 | 1.2 |
| True trimers/true trimers + true dimers ratio by weight | 1 | | | | 0.51 | 1 | 0.3 | 1 |
| True dimers/true trimers ratio by weight | 1.04 | 1.81 | | | 0.95 | | 2.4 | |

The invention claimed is:

1. A process for the preparation of a polyisocyanate composition comprising polyisocyanate trimers, and polyisocyanate dimers, in which the polyisocyanate dimers/polyisocyanate trimers molar ratio is greater than 0.5, comprising polycondensing isocyanate monomers in the presence of a cyclotrimerization catalyst and of a nitrogenous compound composed of a five-membered heterocyclic compound having at least two nitrogen atoms in a nitrogenous cyclic compound/cyclotrimerization catalyst molar ratio of between 0.1:1 and 10:1, wherein the (cyclo)trimerization catalyst is a rare earth metal alkoxide.

2. A process for the preparation of a polyisocyanate composition comprising polyisocyanate trimers, and polyisocyanate dimers, in which the polyisocyanate dimers/polyisocyanate trimers molar ratio is greater than 0.5, comprising polycondensing isocyanate monomers in the presence of a cyclotrimerization catalyst and of a nitrogenous compound composed of a five-membered heterocyclic compound having at least two nitrogen atoms in a nitrogenous cyclic compound/cyclotrimerization catalyst molar ratio of between 0.1:1 and 10:1, wherein the (cyclo)trimerization catalyst is a silazane salt of alkali metals, alkaline earth metals, transition metals and rare earth metals.

3. The process as claimed in claim 1, wherein the polyisocyanate dimers/polyisocyanate trimers molar ratio is greater than 0.6.

4. The process as claimed in claim 3, wherein the polyisocyanate dimers/polyisocyanate trimers molar ratio is greater than 0.75.

5. The process as claimed in claim 1, wherein the nitrogenous cyclic compound/cyclotrimerization catalyst molar ratio is between 0.2:1 and 8:1.

6. The process as claimed in claim 2, wherein the polyisocyanate dimers/polyisocyanate trimers molar ratio is greater than 0.6.

7. The process as claimed in claim 6, wherein the polyisocyanate dimers/polyisocyanate trimers molar ratio is greater than 0.75.

8. The process as claimed in claim 2, wherein the nitrogenous cyclic compound/cyclotrimerization catalyst molar ratio is between 0.2:1 and 8:1.

* * * * *